(12) United States Patent
Scott

(10) Patent No.: US 9,585,415 B2
(45) Date of Patent: Mar. 7, 2017

(54) QUICK PICKLE FERMENTATION CURE

(71) Applicant: A-Ferm Systems, LLC, Emerald Isle, NC (US)

(72) Inventor: William A. Scott, Emerald Isle, NC (US)

(73) Assignee: Fermenting Solutions International, LLC, Emerald Isle, NC (US)

( * ) Notice: Subject to any disclaimer, the term of this patent is extended or adjusted under 35 U.S.C. 154(b) by 94 days.

(21) Appl. No.: 14/591,574

(22) Filed: Jan. 7, 2015

(65) Prior Publication Data
US 2015/0132435 A1  May 14, 2015

Related U.S. Application Data

(63) Continuation-in-part of application No. 14/300,981, filed on Jun. 10, 2014, now abandoned, which is a continuation of application No. 14/057,086, filed on Oct. 18, 2013, now abandoned.

(51) Int. Cl.
A23L 1/218   (2006.01)
A23B 7/154   (2006.01)
A23B 7/10    (2006.01)

(52) U.S. Cl.
CPC ............... *A23L 1/218* (2013.01); *A23B 7/10* (2013.01); *A23B 7/154* (2013.01)

(58) Field of Classification Search
CPC .. A23B 7/10; A23B 7/105; A23B 7/12; A23B 7/153; A23B 7/154; A23B 7/155; A23B 7/157; A23L 1/218
USPC ............................................. 426/8, 9, 49, 52
See application file for complete search history.

(56) References Cited

U.S. PATENT DOCUMENTS

| | | | |
|---|---|---|---|
| 3,403,032 A * | 9/1968 | Etchells et al. | ............. 426/8 |
| 3,993,784 A | 11/1976 | Bell et al. | |
| 4,303,678 A | 12/1981 | Ogasa et al. | |
| 4,352,827 A | 10/1982 | Fleming et al. | |
| 4,383,040 A | 5/1983 | Fricker | |
| 4,579,740 A | 4/1986 | Matrozza | |
| 4,666,849 A | 5/1987 | Daeschel et al. | |
| 4,816,267 A | 3/1989 | Oka | |
| 4,844,929 A | 7/1989 | Kingsley | |
| 4,985,258 A | 1/1991 | Rosen | |
| 5,192,565 A * | 3/1993 | Buhler | ........ A23B 7/0053 426/49 |
| 6,110,513 A | 8/2000 | Hackl et al. | |
| 2003/0183092 A1 | 10/2003 | Barber et al. | |

(Continued)

FOREIGN PATENT DOCUMENTS

WO PCT/KR2005/002009 A1   1/2006

OTHER PUBLICATIONS

Definition of Dice; Oxford English Dictionary, second edition (1989); available at: http://www.oed.com/oed2/00063448; accessed on Feb. 17, 2015.*

(Continued)

*Primary Examiner* — Walter Moore
(74) *Attorney, Agent, or Firm* — James G. Passé; Passé Intellectual Property, LLC

(57) ABSTRACT

The fermentation of cucumbers and other vegetables into pickles is traditionally a long term process. By exposing the flesh of the vegetable and pickling with calcium chloride instead of sodium chloride, a faster fermentation pickle is achieved with no decrease in quality.

11 Claims, 2 Drawing Sheets

(56) References Cited

U.S. PATENT DOCUMENTS

2010/0062123 A1* 3/2010 Anderson et al. ............ 426/250
2013/0052318 A1   2/2013 Davis et al.

OTHER PUBLICATIONS

McFeeters et al., Fermentation of Cucumbers Brined with Calcium Chloride Instead of Sodium Chloride, Journal of Food Science, vol. 75, No month, 2010, p. C291-C296.*
Fleming et al., Controlled Fermentation of Sliced Cucumbers, Journal of Food Science, vol. 43, No month, 1978, p. 888-891.*
Buescher et al., Elevated Calcium Chloride in Cucumber Fermentation Brine Prolongs Pickle Product Crispness, Journal of Food Quality, vol. 34, No month, 2011, p. 93-99.*
wildadmin, Vegetable Fermentation Further Simplified, available at: https://web.archive.org/web/20120501013022/http://www.wildfermentation.com/vegetable-fermentation-further-simplified-2/; accessed on Nov. 25, 2014.*
Challenge, definition from http://www.merriam-webster.com/dictionary/challenge, Dec. 30, 2015.
Produce, definition from https://en.wikipedia.org/wiki/Produce, Mar. 8, 2016.
Thompson, R.L., Effects of Storage Conditions on Firmness of Brined Cucumbers, Journal of Food Science, 1979, pp. 843-846, vol. 44.
Fleming, H.P., Fermented Vegetables, Economic Microbiology. Fermented Foods, 1982, pp. 227-258, vol. 7, chapter 7, Academic Press, Inc., New York.
Lin Tang, Hsiao-Chien, Relationships Among Cell Wall Constituents, Calcium and Texture During Cucumber Fermentation and Storage, Journal of Food Science, 1983, pp. 66-70, vol. 48.
McFeeters, R.F., Effect of Calcium Ions on the Thermodynamics of Cucumber Tissue Softening, Journal of Food Science, Pickle Pak Science, 1990, pp. 446-449, vol. 55, No. 2, Pickle Packers International, Inc., St. Charles, IL, 2002, vol. 8, No. 1.
Fleming, H.P., Effects of Sodium Chloride Concentration on Firmness Retention of Cucumbers Fermented and Stored with Calcium Chloride, Journal of Food Science, 1987, pp. 653-657, vol. 52, No. 3.
Mcfeeters, R.F., Softening Rates of Fermented Cucumber Tissue; effects of pH, Calcium, and Temperature, Journal of Food Science, 1995, pp. 786-788, 793, vol. 60, No. 4.
Fleming, H.P., Fermentation of Cucumbers Without Sodium Chloride, Journal of Food Science, 1995, pp. 312-315, 319, vol. 60, No. 2.
Breidt Jr., Frederick, Fermented Vegetables, Food Microbiology, Fundamentals and Frontiers, 2007, pp. 783-790, 3rd Edition, ASM Press, Washington, D.C.
Fasina, O.O., Bag-In-Box Technology: Temperature Prediction During Blanching and Cooling of Cucumbers, pp. 9-13, U.S. Department of Agriculture, Agricultural Research Service, and North Carolina Agriculture Research Service, NC State University, NC, Nov. 2002.
Etchells, J.L., Factors Influencing the Growth of Lactic Acid Bacteria During the Fermentation of Brined Cucumbers, pp. 12-21, vol. 2, Food Fermentation Laboratory, Southern Region, Agricultural Research Service, United Stated Department of Agriculture, and Department of Food Science, North Carolina State University, Raleigh, NC, 1975.
Melazzini, Franco, and Wendy Veronica, "Effect of Aeration in Calcium Chloride Cucumbers Fermentation", North Carolina State University, available at: http://repository.lib.ncus.edu/ir/bitstream/1840.16/7302/1/etd.pdf, 2011.
Guillou et al., "Calcium chloride and potassium sorbate reduce sodium chloride used during natural cucumber fermentation and storage", Journal of Food Science, 57.6, pp. 1364-1368, 1992.
PCT Search Report from corresponding PCT application No. PCT/US2014/60820, mailed on Jan. 5, 2015.

* cited by examiner

QUICK PICKLE FERMENTATION CURE

This application is a Continuation-In-Part of U.S. non-provisional patent application Ser. No. 14/300,981 filed on Jun. 10, 2014, which is a Continuation of U.S. non-provisional patent application Ser. No. 14/057,086 filed on Oct. 18, 2013, and they are included herein in their entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a method of production of a cured pickle product by fermentation. In particular, the present invention is directed to a method of producing a fermentation cured pickle product quickly, without the traditional fermentation length.

Description of Related Art

Fermented pickle products, such as cucumbers and the like, are popular the world over because of the flavor and appearance that distinguishes them from other types of pickle products.

Commercially produced pickles are fermented in a brine solution of about 6% sodium chloride in large open-top tanks as large as 40,000 liters. The salt in this type of fermentation serves more than one function. For one, it is used to prevent freezing of outside tanks in northern climates. However, the most important function is that the sodium chloride brine solution selects for salt tolerant bacteria, such as *Lactobacillus plantarm*. Salt tolerant bacteria are normally used for fermentations of this type. Salt-tolerant bacteria help maintain the firm texture of the fermented product while the products are stored up to a year in fermentation tanks. It also provides salty flavor in the products made from the fermented fruit. Open tanks have the problem of allowing undesirable microbes and other items to enter the fermentation easily.

Fermentation of fruits, vegetables, and produce reduces sugars in the vegetable and in the brine from about 2% down to less than about 0.1% sugar. In the pickle industry, fermentation of a vegetable is typically considered complete when sugar test strips of the fermentation brine are negative, indicating less than about 0.1% residual sugar remains. Sugar concentration in the fermentation brine equalizes with the sugar concentration in the vegetable, making end of fermentation measurement easy by measuring the sugar in the brine solution. Also, pH of the fermentation brine typically goes down to about 2.9-3.9, also indicating a completed fermentation process. Those in the industry are familiar with methods for testing for fermentation completion.

With traditional fermentation, vegetables can take from about three to four weeks to finish the fermentation process sufficiently for commercial sale. This limits the amount of equipment-produced pickles to several batches per year in optimal conditions. Tank yard operations in the traditional fermenting process involve a large amount of labor and capital, with respect to maintaining the tank yard for these extended processing times. An additional continuing issue for commercial pickle production is the disposal of the salt in a manner that meets current disposal standards, with some local governments severely restricting the amount of salt which can be disposed of. Recycling of the brine from each fermentation batch has shown some benefit in sodium chloride reduction. However, during recycling, the intermingling of brines from different sources, batches, etc., with more diverse microbial content, presents a carryover of "off" or unwanted flavors in the finished product.

Calcium chloride is well known in the pickling process for having an effect when added to the conventional pickling process in that it increases the firmness of the preserved fruit, especially with cucumbers. Calcium chloride is considered more environmentally friendly than sodium chloride, and the disposal of calcium chloride as a waste product is less of an issue. Whole cucumber pickles have been utilized in a process involving only calcium chloride, and the results of this calcium chloride process indicated that a similar result, in terms of fermentation time, can be obtained without use of sodium chloride. Since no time difference was observed between the calcium chloride process and the sodium chloride process, the processes used did nothing to deal with the length of time it takes to ferment pickles and the problems with low equipment use turnover.

BRIEF SUMMARY OF THE INVENTION

The present invention relates to the discovery of a process of fermenting pickles with calcium chloride such that the pickling time is greatly reduced and the turnover rate of fermentation tanks is much higher. By cutting, slicing, or piercing the produce prior to the pickling process, greatly reduced fermentation times are achieved.

Accordingly, in one embodiment the present invention relates to an accelerated method of pickling fresh produce in a solution without sodium chloride comprising the steps of:
 a) exposing at least a portion of the internal flesh of the fresh produce by at least one method of the group consisting of piercing, cutting, slicing, and dicing; and
 b) adding the fresh produce to a fermentation container containing a solution without sodium chloride, the solution comprising; a pickling fermentation culture, and calcium chloride of about 0.5% to about 2.0% on w/w basis of the water; and
 c) fermenting the produce with the solution at a temperature of about 25° C. to about 35° C. for about five days or less until fermentation is complete, wherein the end of fermentation is measured by sugar concentration in the solution being reduced to less than about 0.1%.

DETAILED DESCRIPTION OF THE INVENTION

Figure 1:
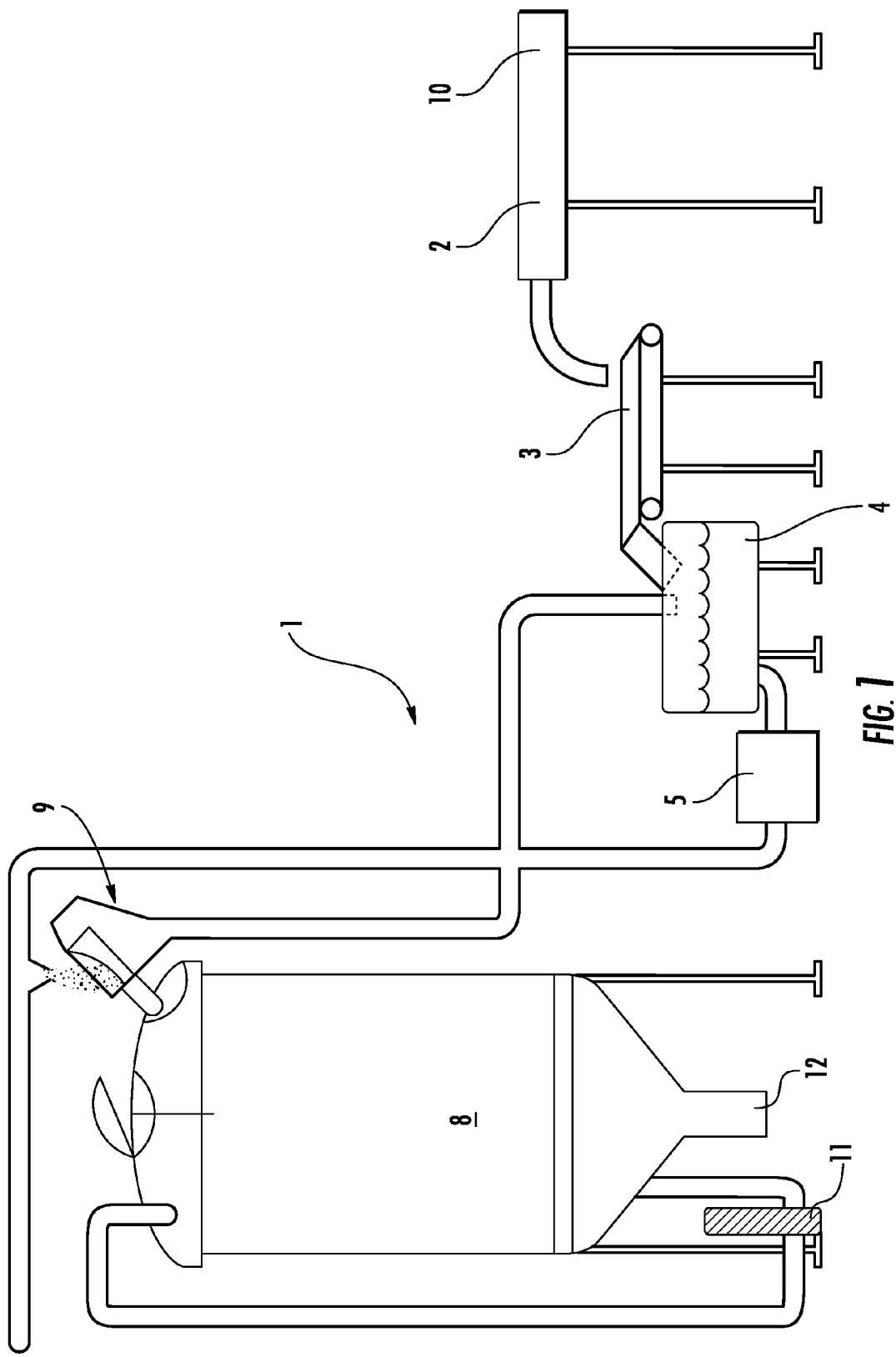
FIG. 1 is an example of the mechanical arrangement of the method of the present invention.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitations thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Normally, the fermentation of produce in a brine solution takes on the order of several weeks to several months to complete on a commercial scale. As used herein the term "accelerated" refers to completion of the pickling process in five days or less. In one embodiment, in three days or less, in another embodiment, two days or less (48 hours or less) and, in one embodiment, completion is within 1, 2, 3, 4, 5, 6, or 7 days. In one example, cubed cucumbers using sodium chloride fermentation would take 8-14 days to complete fermentation (i.e. all sugars fermented). In the present invention, the same cubed cucumbers would be completely fermented in 48 hours, reducing the fermentation time to ⅕ the original time.

As used herein the term "pickling" in the claims refers to the brine fermentation curing of vegetables in a solution of calcium chloride of a concentration of about 0.5% to about 2.0% on a w/w basis of the water in the brine. In addition, a suitable pickling culture such as *Lactobacillus plantarum*, or the like bacteria, is utilized or added to create the fermentation. In one embodiment of the invention, the brine consists essentially of calcium chloride and no other brining ingredients. The brine, in one embodiment, can also contain herbs and spices, as well as known yeast and mold inhibitors known in the art of food processing. For example, potassium sorbate inhibits both yeast and molds and could be utilized. In one embodiment, potassium sorbate is added in a concentration of about 0.1%.

As used herein the phrase "exposing at least a portion of the internal flesh of the fresh produce" refers to the act of cutting, slicing, dicing, piercing or the like, such that a physical exposure of the internal flesh of the vegetable occurs and the brine can come into contact with the exposed flesh. One can expose as little or as much as desired, but larger amounts of exposed flesh, as provided by slicing, for example, give the greatest exposure to the flesh. "Slices" refers generally to slices 3/16 inches thick or thinner. Thick slices are greater than about 3/16 inches and can be ½ inch thick or larger. Piercing refers to whole produce that has been punctured multiple times, and dicing can be regular shapes ½ inch thick or less. Cutting refers to cuts in the whole produce or cutting into chunks.

Once the flesh is exposed, the exposed vegetable is optionally water washed for a time sufficient to allow for a reduction in the sugars present in the fresh produce. Fermentation time, with this washing step, is much reduced, as opposed to fermentation time without the washing step. The time, in general, for the wash is roughly three minutes. One skilled in the art can determine the optimum soak time depending on the particular vegetable and the amount of interior flesh that is exposed, the size of the vegetable, and the like, in view of this disclosure. Once the washing step is completed, the wash water is removed by means known in the art. In one embodiment, it is done by use of a hydrosieve. Fresh water is removed before beginning the fermentation step (optionally the wash water is utilized in the fermentation step).

The produce is then added to a fermentation tank, then covered with water and enough calcium chloride added to make a solution of about 0.5% to about 2% w/w, as described above. In one embodiment, the solution is made isotonic. Since this method is designed primarily for commercial size production, the fermentation vessel in one embodiment is at least 19,000 liters (though any size big enough to fit a single piece of a produce or larger will work), and the tank is filled with produce to a level of about 45% produce and 55% solution, though the range is from about 30/70 to 70/30 volume basis. In addition, the culture and mold and yeast inhibitors are added as well. In one embodiment, the tank has a closed top to prevent entry of random bacteria and other unwanted items. The solution is brought to a temperature ideal for the *lactobacillus* fermentation, which is between 25° to 35° Celsius, and held for a length of fermentation time as described above. The fermentation is complete when sugar concentration in the brine is measured (e.g. by glucose test strip) at about 0.1% or less. Generally, all produce fermentation can be completed in about five days or less. In most cases, sliced produce can be completely fermented in 2-3 days, and a dice of 3/16 inches or less of produce can be completely fermented in two days or less.

Now referring to the drawings, FIG. 1 shows a commercial production arrangement 1 using the method of the present invention. In this view, a commercial step for exposing the flesh of the produce 10 is done at the cutter/dicer 2. The produce is then transferred to the shaker screen 3, which removes small unwanted pieces and debris while transferring the produce to a wet tank 4 for the soaking step as described above. Next, water transfer pump 5 transfers the water and produce to the commercial fermentation tank 8 after the wash water is optionally removed via a hydrosieve 9 positioned right before the produce enters the fermentation tank 8. The appropriate amount of calcium chloride, the fermentation culture flavorings, water and the like are added to the tank. A heat exchanger 11 keeps the fermentation at the appropriate temperature, e.g. 30 degrees C. for the desired time, and then water and produce are removed via fermentation tank drain 12 to the bottom of the fermentation tank 8 via gravity once the pickles are fermented to a brine sugar content of 0.1% or less.

Figure 2:
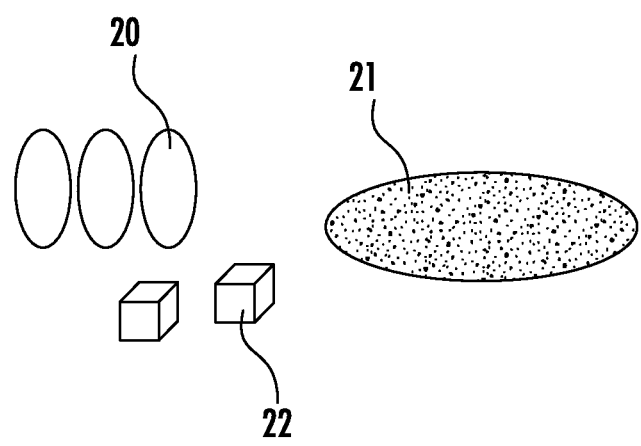
FIG. 2 is an example of cucumbers that have been sliced, cut (diced) and pierced.

FIG. 2 shows cucumbers that have been sliced 20, pierced 21, and diced 22 for their addition to the fermentation process of the present invention.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. An accelerated method of commercially pickling fresh produce in a commercial sized fermentation tank containing a brine water solution without sodium chloride, comprising the steps of:
   a) exposing at least a portion of the internal flesh of the fresh produce by at least one method of the group consisting of piercing, cutting, slicing, and dicing;
   b) adding the fresh produce that is pierced, cut, sliced or diced to a commercial fermentation tank containing a brine water solution, the brine water solution consisting of water, a pickling fermentation culture, calcium chloride of about 0.5% to about 2.0% on w/w basis of the water, and at least one of a yeast inhibitor, a mold inhibitor, a herb and a spice;
   c) fermenting the produce with only the brine water solution at a temperature of about 25 C to about 35 C for about five days or less until fermentation is complete, wherein the end of fermentation is measured by sugar concentration in the solution being reduced to less than about 0.1%; and
   d) removing the fermented produce from the commercial fermentation tank.

2. The pickling method according to claim 1 wherein the calcium chloride is present at about 1% w/w of the water solution.

3. The pickling method according to claim 2 wherein the solution is isotonic.

4. The pickling method according to claim 1 which further comprises the additional step of water washing the fresh produce's exposed flesh with a water solution for a time sufficient to allow for a reduction in the sugars present in the fresh produce prior to contacting the exposed fresh produce with the fermentation solution in step b).

5. The pickling method according to claim 4 wherein the water solution is removed by a hydrosieve.

6. The pickling method according to claim 1 wherein the produce is submerged.

7. The pickling method according to claim 1 wherein the produce is diced and the fermentation is complete in about two days or less.

8. The pickling method according to claim 1 wherein the produce is sliced and fermentation is complete in about three days or less.

9. A method according to claim 1 wherein the produce is cucumber.

10. A method according to claim 1 wherein the at least one of a yeast and a mold inhibitor is potassium sorbate.

11. A method according to claim 1 wherein the size of the commercial fermentation tank is at least 19,000 liters.

* * * * *